United States Patent
Galla et al.

(10) Patent No.: US 10,958,056 B2
(45) Date of Patent: Mar. 23, 2021

(54) POWER DISTRIBUTION MODULE FOR INDUSTRIAL ENGINES

(71) Applicant: LOR Manufacturing Company, Inc., Weidman, MI (US)

(72) Inventors: Jayson W. Galla, Lake Isabella, MI (US); Brock J. Gietzen, Remus, MI (US); Noah D. Reyburn, Weidman, MI (US); Brendan M. DeLorenzo, Mount Pleasant, MI (US)

(73) Assignee: LOR Manufacturing Company, Inc., Weidman, MI (US)

(*) Notice: Subject to any disclaimer, the term of this patent is extended or adjusted under 35 U.S.C. 154(b) by 0 days.

(21) Appl. No.: 16/557,081

(22) Filed: Aug. 30, 2019

(65) Prior Publication Data

US 2020/0076176 A1  Mar. 5, 2020

Related U.S. Application Data

(60) Provisional application No. 62/724,971, filed on Aug. 30, 2018.

(51) Int. Cl.
*H02G 3/16* (2006.01)
*F02N 11/08* (2006.01)
(Continued)

(52) U.S. Cl.
CPC .......... *H02G 3/16* (2013.01); *F02N 11/0862* (2013.01); *H01R 12/722* (2013.01); *H02G 3/081* (2013.01)

(58) Field of Classification Search
CPC . H01L 2224/32225; H01L 2224/48227; H01L 2224/73265; H01L 2924/00014;
(Continued)

(56) References Cited

U.S. PATENT DOCUMENTS 5,023,752 A * 6/1991 Detter ................. B60R 16/0238
361/646
5,179,503 A * 1/1993 Fouts ..................... H05K 7/026
307/10.1
(Continued)

OTHER PUBLICATIONS

Molex, LLC, Micro Power Distribution Box (μPDB) Sealed Modules, Online Brochure, 2019, Website: https://www.molex.com/molex/products/family?key=pdb_custom_sealed_modules&channel=products&chanName=family&pageTitle=Introduction.
(Continued)

*Primary Examiner* — Adam B Dravininkas
(74) *Attorney, Agent, or Firm* — Dinsmore & Shohl LLP

(57) ABSTRACT

A system for an industrial engine that includes a power distribution module (PDM), a distribution harness and an interface harness. The PDM includes a housing body defining an interior, an end wall, a circuit board coupled to the end wall such that the circuit board is positioned within the interior of the housing body and a plurality of attachment connectors communicatively coupled to the circuit board. The plurality of attachment connectors positioned to provide an accessible location outside of the interior of the housing body. The distribution harness is communicatively coupled to the plurality of attachment connectors and to an electrical component of the industrial engine. The distribution harness is configured to distribute power from the PDM to the at least one electrical component. The interface harness communicatively coupled to one of the plurality of attachment connectors and is configured to communicatively couple the PDM to an engine start panel.

20 Claims, 7 Drawing Sheets

(51) Int. Cl.
*H02G 3/08* (2006.01)
*H01R 12/72* (2011.01)

(58) Field of Classification Search
CPC .......... H01L 2224/48091; H02J 7/0042; F02D 2200/021; F02D 41/22; F02D 2041/288; F02D 41/1497; F02D 45/00; H02G 3/16; H02G 3/081; F02N 11/0862; F02N 11/0803; H01R 12/722
See application file for complete search history.

(56) References Cited

U.S. PATENT DOCUMENTS

| | | | | |
|---|---|---|---|---|
| 5,785,532 | A * | 7/1998 | Maue | B60R 16/0238 439/34 |
| 5,788,529 | A * | 8/1998 | Borzi | H01R 9/2458 439/364 |
| 6,148,258 | A * | 11/2000 | Boisvert | F02P 19/022 123/145 A |
| 6,150,734 | A * | 11/2000 | Neibecker | B60R 16/0238 307/10.1 |
| 6,252,310 | B1 | 6/2001 | Wilhelm | |
| 6,350,949 | B1 * | 2/2002 | Boyd | B60R 16/0238 174/17.05 |
| 6,937,461 | B1 * | 8/2005 | Donahue, IV | H01R 13/514 361/622 |
| 7,072,188 | B2 | 7/2006 | Janisch | |
| 7,192,289 | B2 | 3/2007 | Kowalski | |
| 7,420,822 | B2 | 9/2008 | Janisch | |
| 7,558,079 | B2 | 7/2009 | Janisch | |
| 7,907,423 | B2 * | 3/2011 | Lopes | B60R 16/0238 361/822 |
| 8,370,656 | B2 | 2/2013 | Gupta | |
| 9,192,068 | B2 | 11/2015 | Hara et al. | |
| 2006/0131885 | A1 * | 6/2006 | Wurtele | B60H 1/00378 290/1 A |

OTHER PUBLICATIONS

Würth Elektronik ICS Gmbh & Co. KG, REDline Power Boxes, Online Brochure, 2019, Website https://www.we-online.com/web/en/intelligente_systeme/produkte_neu/powermanagement/redline_power_boxes/redline_power_boxes_1.php.

* cited by examiner

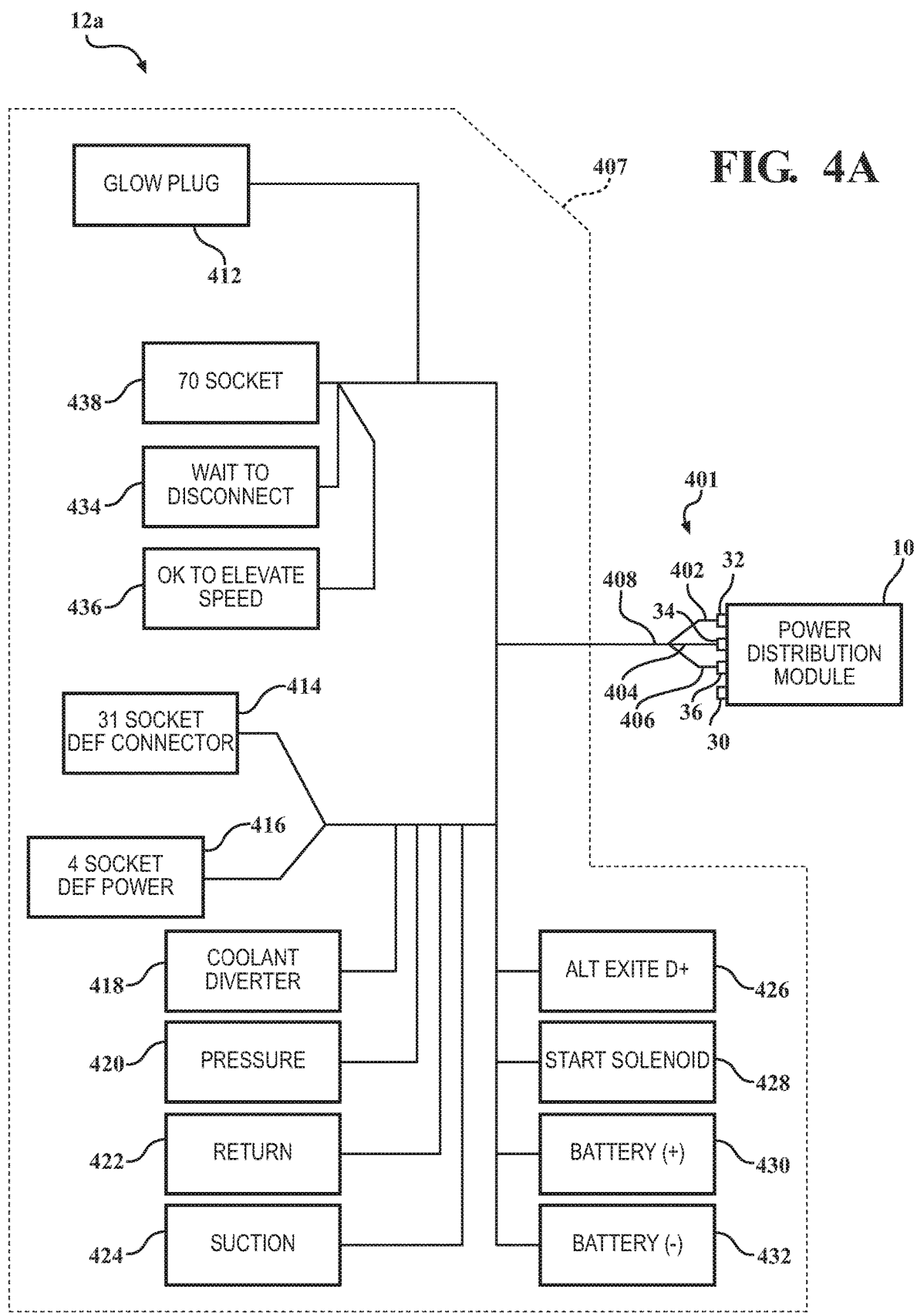

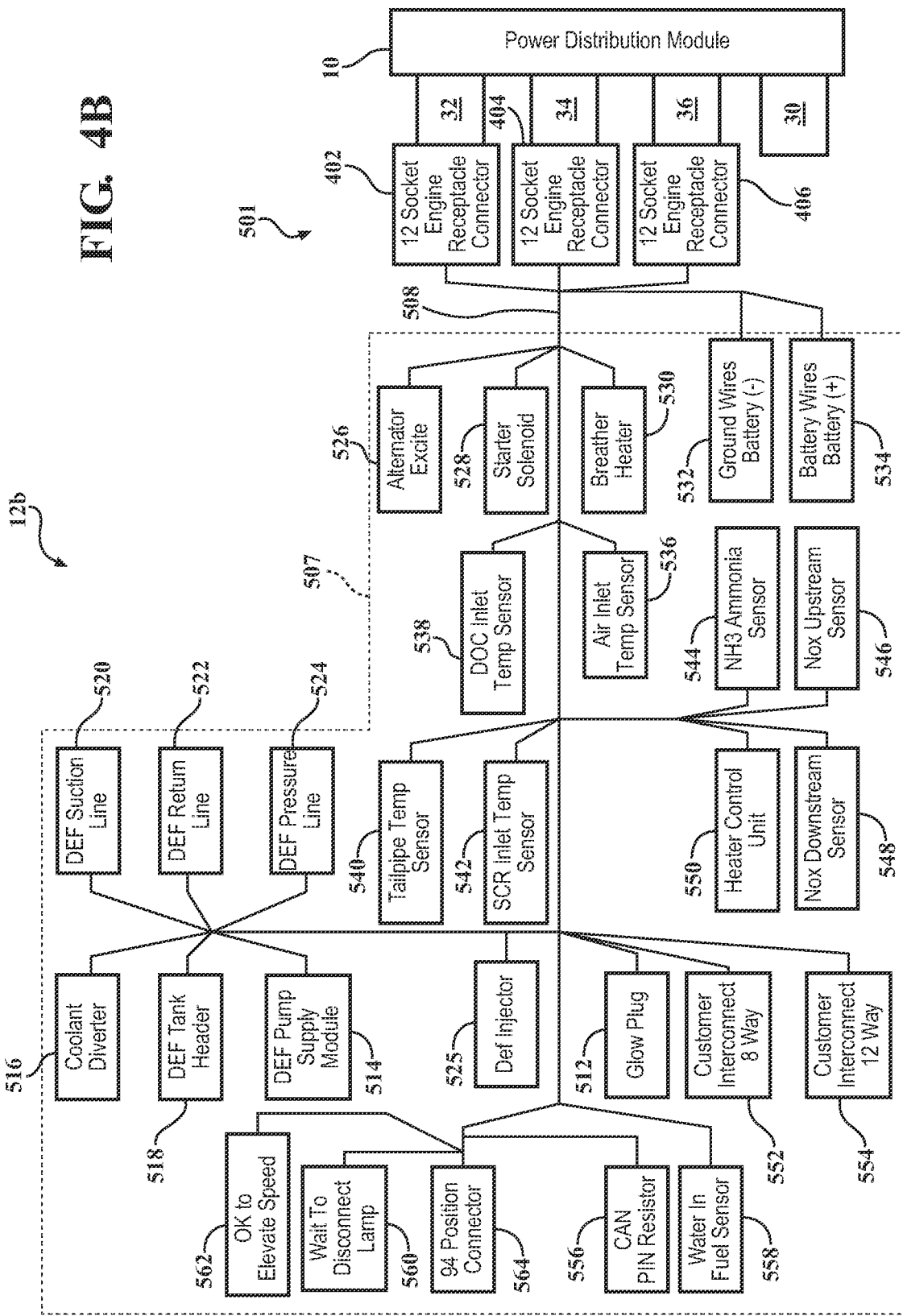

POWER DISTRIBUTION MODULE FOR INDUSTRIAL ENGINES

CROSS REFERENCE TO RELATED APPLICATIONS

This utility patent application claims priority from U.S. Provisional Patent Application Ser. No. 62/724,971, filed on Aug. 30, 2018, the entire contents of which is incorporated herein in its entirety.

TECHNICAL FIELD

The present specification generally relates to industrial engines and, more specifically, a power distribution module for use with such engines.

BACKGROUND

The increase in technological advancements of industrial engines and emissions standards have made electronic connections more complex. With increased electrical connections and fusing requirements, power distribution modules and engine specific harnesses are required. As such, current engine manufacturers produce an application and installation manual defining wiring and fusing requirements for the modules and the harnesses. Further, these power distribution module and harness connections are produced according to such known requirements.

For example, among existing references, Janisch, U.S. Pat. No. 7,558,079, teaches a power distribution module having a housing with a plurality of wall located receptacles which are engaged by electrical conductors/connectors of a wire harness for communicating with the electrical components within the housing. Also disclosed in Janisch is a method for producing a plurality of personal RV models having differing electrical components installed into a common housing for a power distribution module. However, Janisch and other existing references fail to teach standardizing connection points to reduce customer installation and manufacturing process times.

Accordingly, a need exists for alternative power distribution modules, in conjunction with the power distribution harnesses, to provide all the necessary engine connections to offer a simplified connection point(s) for customer use.

SUMMARY

In one embodiment, a power distribution system for an industrial engine is provided. The system includes a power distribution module, a distribution harness and an interface harness. The power distribution module includes a housing body defining an interior, an end wall portion having an interior surface and an exterior surface, the interior surface configured to abut the interior of the housing body in a closed position, a circuit board coupled to the interior surface of the wall portion such that in the closed position, the circuit board is positioned within the interior of the housing body, and a plurality of attachment connectors communicatively coupled to the circuit board. The plurality of attachment connectors positioned on the exterior surface of the end wall portion. The distribution harness is communicatively coupled to the plurality of attachment connectors and to at least one electrical component. The distribution harness is configured to distribute power from the power distribution module to the at least one electrical component. The interface harness communicatively coupled to one of the plurality of attachment connectors, wherein the interface harness is configured to communicatively couple the power distribution module to an engine start panel.

In another embodiment, a power distribution system is provided. The system includes a power distribution module, a distribution harness and an interface harness. The power distribution module includes a housing body defining an interior, an end wall portion having an interior surface and an exterior surface, the interior surface configured to abut the interior of the housing body in a closed position, a circuit board coupled to the interior surface of the end wall portion such that in the closed position, the circuit board is positioned within the interior of the housing body, and a plurality of attachment connectors communicatively coupled to the circuit board. The plurality of attachment connectors positioned on the exterior surface of the end wall portion to provide an accessible location outside of the interior of the housing body. The distribution harness is communicatively coupled to the plurality of attachment connectors and to at least one electrical component of the industrial engine. The distribution harness is configured to distribute power from the power distribution module to the at least one electrical component. The interface harness communicatively coupled to one of the plurality of attachment connectors. The interface harness is configured to communicatively couple the power distribution module to an engine start panel.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4A schematically depicts a first example distribution harness according to one or more embodiments shown and described herein;

FIG. 4B schematically depicts a second example distribution harness according to one or more embodiments shown and described herein.

DETAILED DESCRIPTION

Embodiments described herein are directed to a power distribution system for industrial engines that includes a power distribution module and a distribution harness. The power distribution module includes a housing and a cover. The housing defines an interior and includes a wall having a plurality of attachment connections in a component attachment portion. The attachment connections are spaced-apart and adapted for receiving and securing electrical components within the housing. The distribution harness includes a plurality of receptacles configured as electrical conductors and corresponded to the plurality of attachment connections. The electrical conductors electrically cooperate with the plurality of attachment connections to communicatively couple to the power distribution module to the electrical components. The conductors of the distribution harness are adapted to distribute power to the various outputs of the module, such as the necessary fusing, engine, and sensor connections.

One of the plurality of attachment connections is an interface attachment connection. The interface attachment connection is configured for a simplistic, single connector that communicatively couples the power distribution module to an engine start panel to start, run, throttle, view all engine parameters, and remotely shutdown the industrial engine. For example, the interface receptacle connection communicatively couples the power distribution module to a supplied battery power for a key switch of the engine start panel, a supplied ground connection, a starter input, a switched voltage (enable engine), a controller area network communication (CAN) bus low, a CAN high, and a remote shutdown.

As such, the power distribution system, and in particular, the plurality of attachment connections, the interface harness, and the distribution harness are scalable between a plurality of industrial engines and a plurality of engine start panels such that the power distribution system may be used across a variety of models of industrial engines using the standardized housing, similar circuit boards, and common distribution harnesses.

As used herein, the term "communicatively coupled" means that coupled components are capable of exchanging data signals with one another such as, for example, electrical signals via conductive medium, electromagnetic signals via air, optical signals via optical waveguides, and the like.

Figure 1:
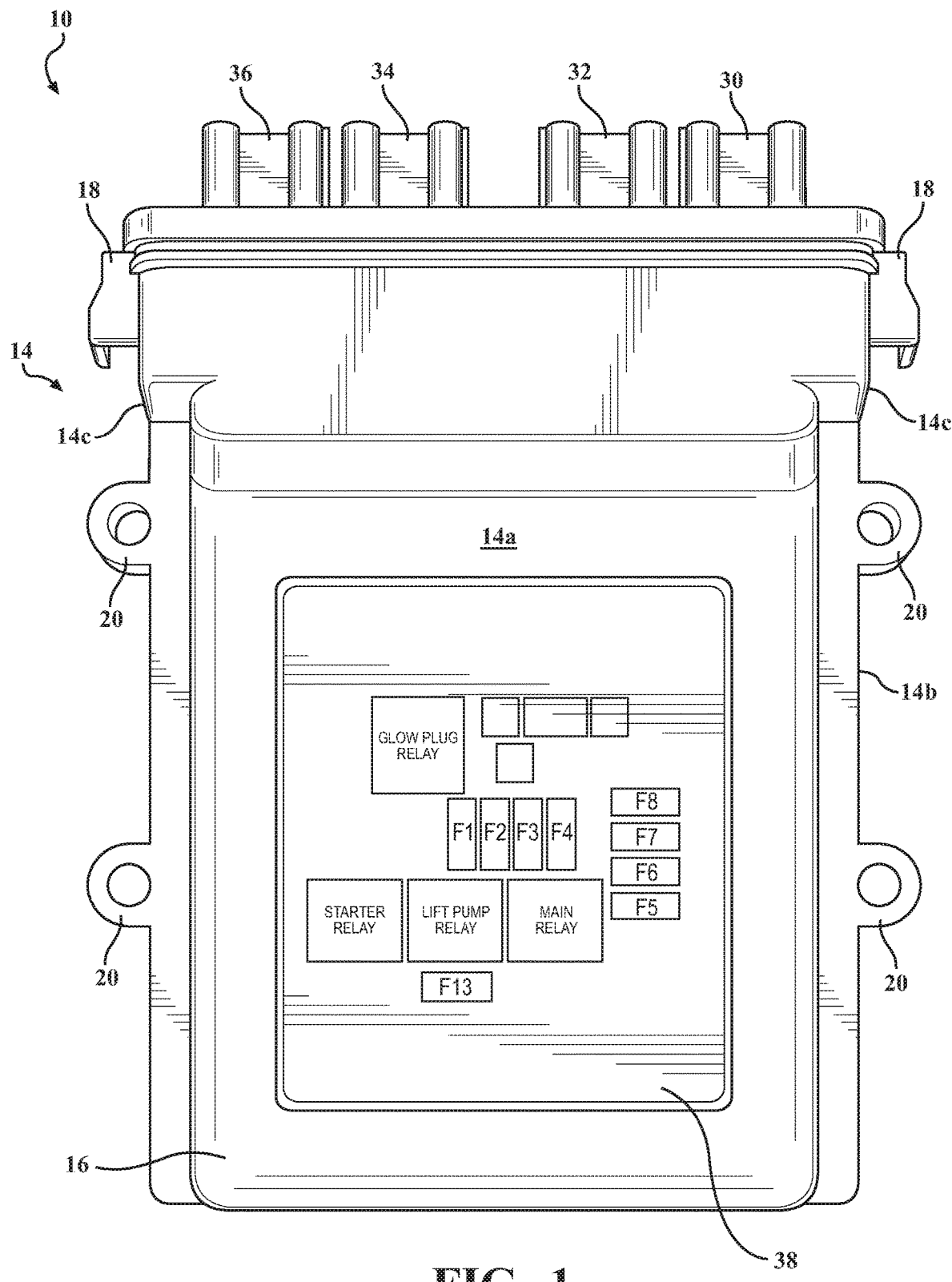
FIG. 1 schematically depicts a front view of a power distribution module according to one or more embodiments shown and described herein.
Figure 5:
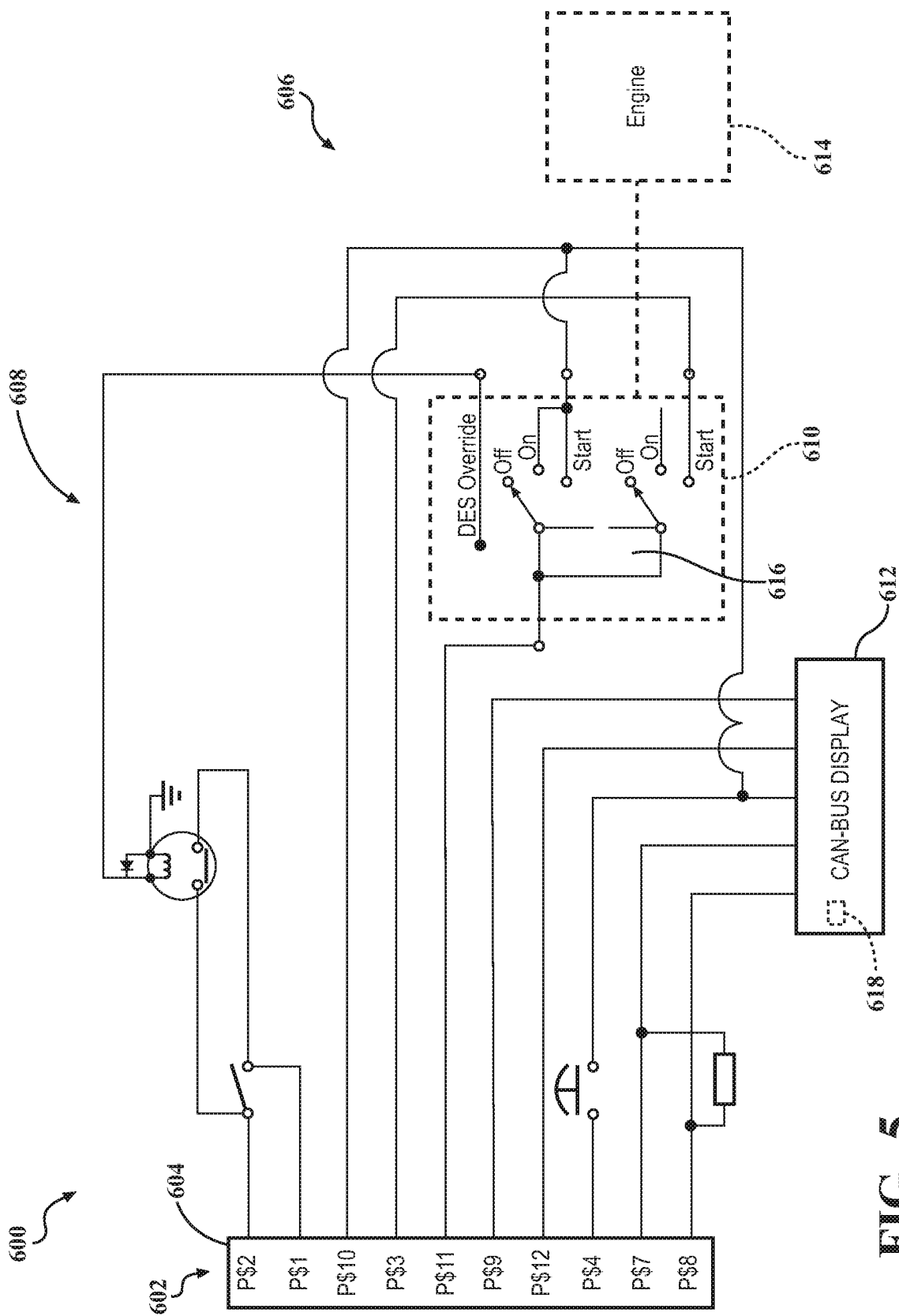
FIG. 5 schematically depicts an interface harness wiring schematic commutatively coupling the power distribution module of FIG. 1 to an engine start panel and to the industrial engine according to one or more embodiments shown and described herein.

Now referring to FIGS. 1 and 2, a power distribution module 10 for use on industrial engines will be described. In combination with the power distribution module 10, a first example distribution harness 12a (FIG. 4A) and/or a second example distribution harness 12b (FIG. 4B) is utilized for establishing all relevant connections to and from an industrial engine 614 (FIG. 5), such as a diesel engine. In some embodiments, the diesel engine is a large scale engine commonly used in vehicles and industrial equipment, such as concrete sprayers, wood chippers, generators, earthmovers, and the like. In other embodiments, the diesel engine is small scale engine. The first example distribution harness 12a (FIG. 4A) and/or a second example distribution harness 12b (FIG. 4B) each includes a plurality of power connections, ground connections, and a variety of inputs/outputs as indicated. As further understood in the relevant technical art, these connections are unique in their ability to start and run the industrial engine 614 (FIG. 5).

The power distribution module 10 includes a housing body 14 having a front wall 14a, an opposing rear wall 14b, and a pair of sidewalls 14c defining an interior cavity 16. The housing body 14 further includes a pair of receiving portions 18 positioned on opposite sides of the housing body 14. In some embodiments, the pair of receiving portions 18 are positioned on the each of the pair of sidewalls 14c.

Further, the housing body 14 includes a plurality of apertures 20 positioned around a perimeter of the housing body 14. The plurality of apertures 20 are configured to attach the housing body 14, and the contents therein, to a structure, such as an industrial engine compartment. Further, the front wall 14a may include schematic indicia 38, or a component arrangement guide, indicating placement of the electrical components. The schematic indicia 38 may be provided as a decal, which can be pre-printed with electrical component locations arranged for later installation.

A circuit board 22 is coupled to an end wall 24. The end wall 24 includes an interior surface 24a and an exterior surface 24b. The coupling of the circuit board 22 to the interior surface 24a of the end wall 24 is by known methods to those skilled in the art. Further, the end wall 24 includes a pair of snap tabs 26. The circuit board 22 is configured to slidably engage with the interior cavity 16 of the housing body 14 such that the circuit board 22 is supported within the interior cavity 16 of the housing body 14 when in a closed position. The closed position may be when the circuit board 22 is slidably engaged within the interior cavity 16 and the snap tabs 26 are releasably coupled with the pair of receiving portions 18 such that the interior surface 24a abuts the interior cavity 16 to form a single component. That is, the housing body 14 is attachable over the circuit board 22, and may be further affixed to the housing body 14 via snap tabs 26, which engage the receiving portions 18 along bottom perimeter locations of the housing body 14 to secure the end wall 24, and the circuit board 22, to the housing body 14. That is, it should be appreciated that the end wall 24 and/or the circuit board 22 is removable from the housing to permit changing of the components, as discussed in greater detail herein.

In some embodiments, the interior surface 24a of the end wall 24 further includes a gasket 28 that is configured to seal the end wall 24 with the housing body 14 such that, in the closed position, the connection between the end wall 24 and the housing body 14 is water tight. Further, in embodiments, the snap tabs 26 are resilient members.

A plurality of attachment connectors 29 are positioned along the exterior surface 24b of the end wall 24 and are communicatively coupled to the circuit board 22. As illustrated, the plurality of attachment connectors 29 may include, for example, an interface attachment connector 30, a power attachment connector 32, a first engine attachment connector 34, and a second engine attachment connector 36. It should be appreciated that this as a non-limiting example and the plurality of attachment connectors 29 may include more or fewer attachment connectors that what is described herein. It should be understood that each of the plurality of attachment connectors 29 are independently keyed such that only a single receptacle may be communicatively coupled to the corresponding attachment connector (i.e., interface attachment connector 30, a power attachment connector 32, a first engine attachment connector 34, and a second engine attachment connector 36), as discussed in greater detail herein. Further, in a non-limiting example, each of the plurality of attachment connectors 29 are 12-pin deustsch connectors.

It should also be understood that each of the plurality of attachment connectors 29 are communicatively coupled to the circuit board 22 and the components thereon, as discussed in greater detail herein. That is, the plurality of attachment connectors 29 may be directly bonded to the circuit board by methods as appreciated by those skilled in the art. As such, in the closed configuration, the plurality of attachment connectors 29 pass from the interior cavity 16 to the exterior of the housing body 14 along the single wall.

The circuit board 22 may include a plurality of relay circuits 40 and a plurality of fuses 42 that utilize fusing and busing to fulfill requirements based on the specific industrial engine applications. For example, in some embodiments, there are dedicated pins on the circuit board that allow for battery voltage supply and, in turn, the power distribution module 10 distributes power accordingly through necessary fuse locations and relay contacts. It should be appreciated that the pins are dedicated to control the intended fused voltage, controlled function outputs, or serve as an input function control. Further, it should be appreciated that a voltage may be varied, or changed, based on the type of distribution harness and/or the relays may be replaced with the appropriate voltage components corresponding with the industrial engine applications, as discussed in greater detail herein. In some embodiments, the voltage is a 12-volt application. In other embodiments, the voltage is a 24-volt application. However, it should be appreciated that these are non-limiting voltages and the voltage application may be less or greater than the range disclosed herein.

Further, it should be appreciated that the arrangement of the plurality of relay circuits 40 and/or the plurality of fuses 42 permit for interchangeability of fuses and depending on the harness, interchangeability of circuit that the power distribution module 10 supplies. Further, another advantage is that the combination of the plurality of relay circuits 40 and/or the plurality of fuses 42 and the circuit board utilizes "off the shelf" components to provide for placement/replacement of items such as relays and fuses, the ability to quickly be modified or interchanged allowing versatility in providing various voltage and amperage ranges dictating the operational requirements of the module. The circuit board 22 may be a printed circuit board. Further, the circuit board 22 may be a multi-layered board that may include a layered fiberglass impregnated with an epoxy and a copper foil.

Still referring to FIG. 2 and now also referring to FIG. 3A, a schematic 300 of the plurality of relay circuits 40 and a plurality of fuses 42 will be discussed. As illustrated, the circuit board 22 of the power distribution module 10 is configured with a plurality of relay circuits 302 and a plurality of fused circuits 304. That is, the plurality of relay circuits 302 may be a plurality of externally controlled power switching circuits configured to control the flow of current to various engine related systems via a power switching device. The externally controlled power switching circuits may be controlled via external logic system, switches, contacts, sensors, senders or other various devices. Further, current to these devices is limited by a current limiting device. Example externally controlled power switching circuits may include, but is not limited to, an engine starter motor control circuit, an engine fuel pump power circuit, an engine clean emission module system power circuit and an engine glow plug circuit.

Further, current limited devices are employed in circuits to prevent damage to both the industrial engine, the distribution harness, and the like in the event of an over current scenario. It should be appreciated that the current limited devices may be diodes, resistors and the like. Example power switching circuits that are incorporated with current limiting devices within the present disclosure are the engine starter motor control circuit, the engine fuel pump power circuit, the engine clean emission module system power circuit, the engine glow plug circuit, an engine diesel exhaust fluid system power circuit, an engine control module power supply, an engine diesel clean emission module power circuit, and an interface power supply.

Figure 2:
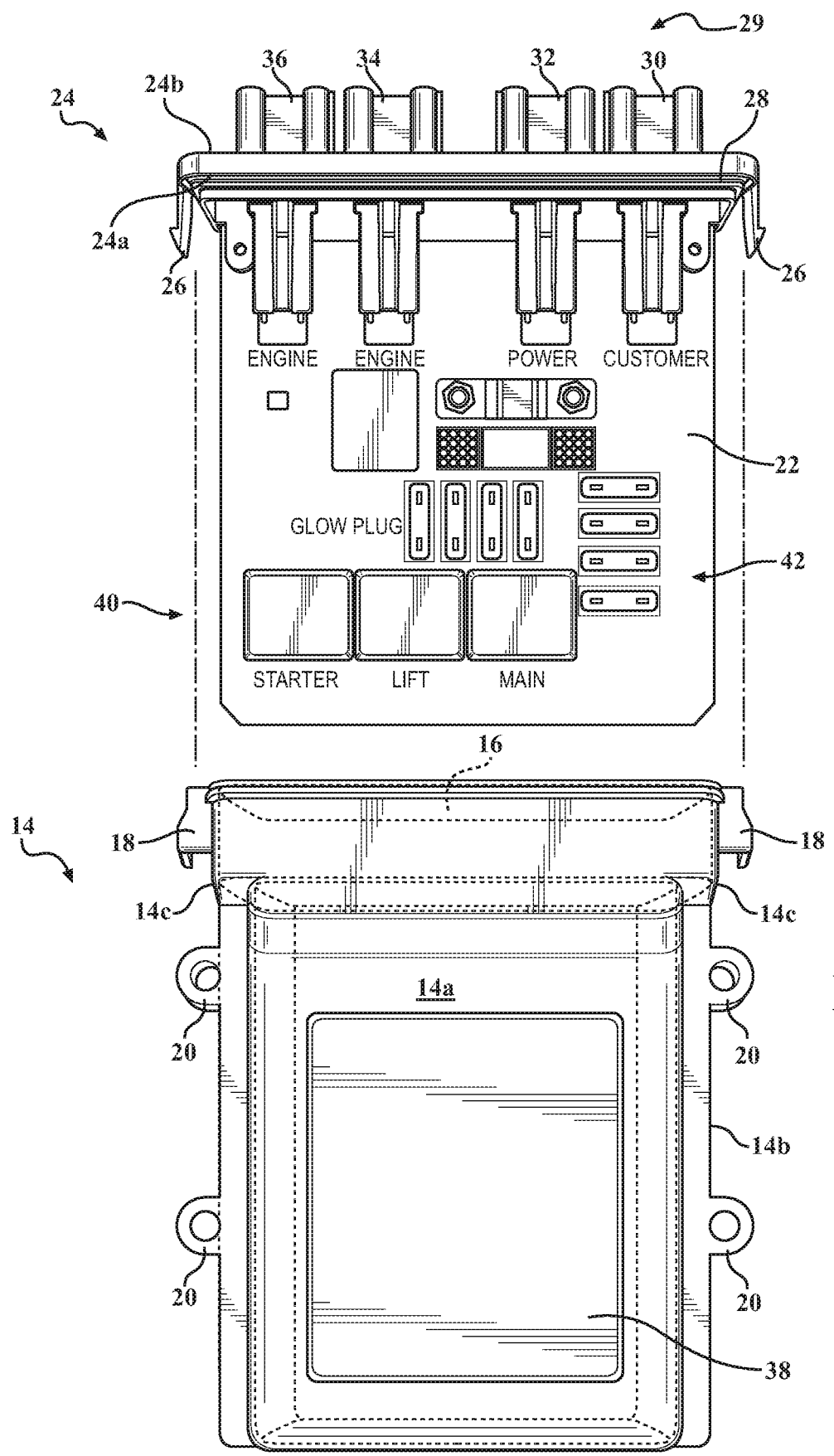
FIG. 2 schematically depicts an exploded front view of the power distribution module of FIG. 1 according to one or more embodiments shown and described herein.
Figure 3A:
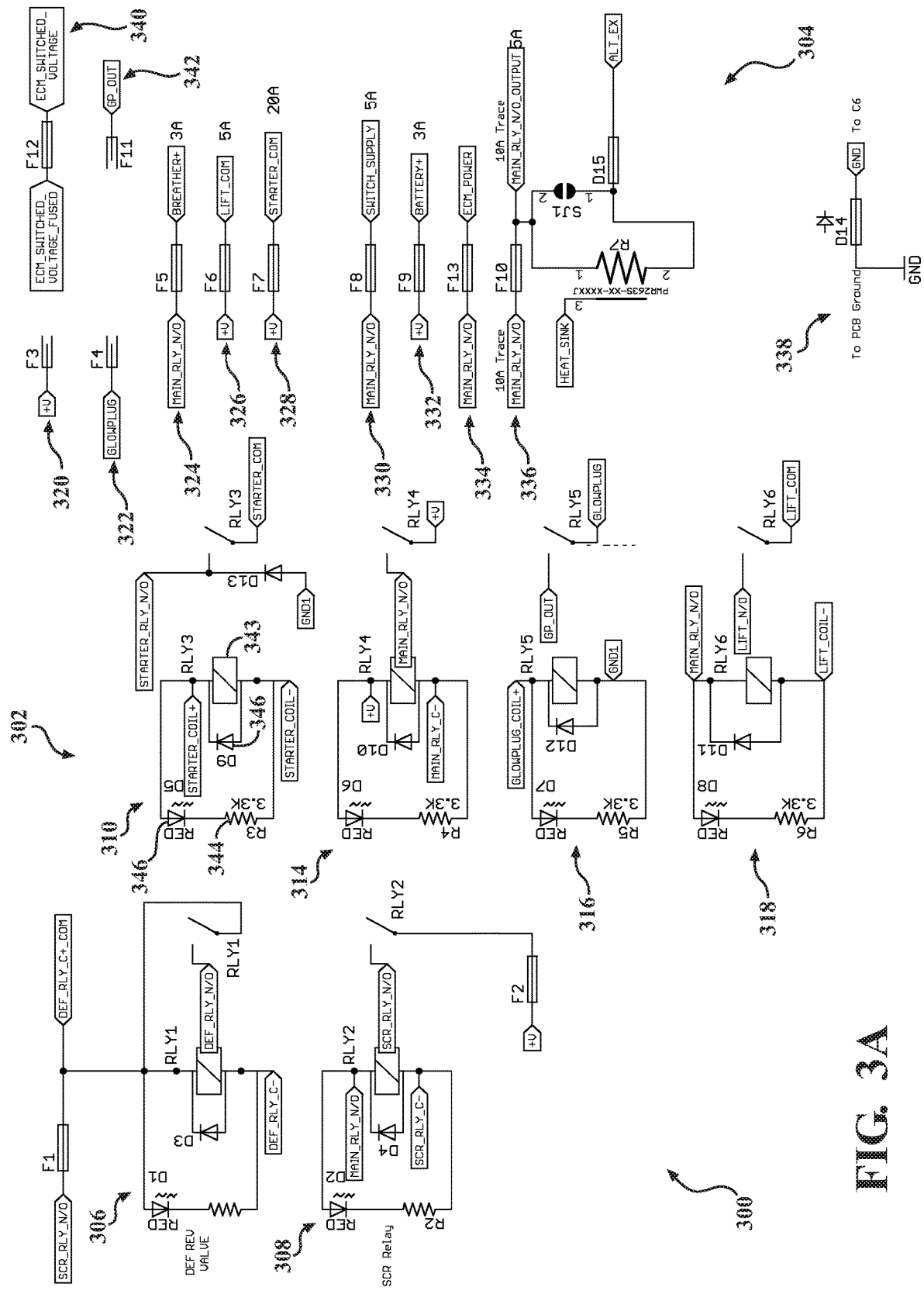
FIG. 3A schematically depicts a schematic of a plurality of relay circuits and fused circuits of the power distribution module of FIG. 1 according to one or more embodiments shown and described herein.

Still referring to FIGS. 2 and 3A, it should be appreciated that the plurality of relay circuits 302 and a plurality of fused circuits 304 is not limited to the disclosure herein and the disclosure herein is merely an example of the plurality of relay circuits 302 and a plurality of fused circuits 304 as appreciated by one skilled in the art. Further, the plurality of relay circuits 302 and a plurality of fused circuits 304 are only briefly discussed for brevity reasons with the understanding that one skilled in the art would fully understand the circuits, the components, the industrial engine applicability, the distribution harness, and the like, and the interactions therebetween.

As illustrated, the plurality of relay circuits 302 may include a first control relay 306 configured for diesel exhaust fluid (DEF) pumps/reversing valves in after treatment systems, a second control relay 308 configured to control selective catalytic reduction (SCR) emissions, and a third control relay 310 configured to control a starter solenoid. Further, the plurality of relay circuits 302 may include a fourth control relay 314 configured to control a main relay, a fifth control relay 316 configured to control a glow plug coil, and a sixth control relay 318 configured to control a lift coil.

The plurality of fused circuits 304 may include a first fused circuit 320 as a current limiter from a voltage or a power input, a second fused circuit 322 between the glow plug of the industrial engine and the circuit board 221, a third fused circuit 324 between the fourth control relay 314 configured to control the main relay and a breather, a fourth fused circuit 326 between the voltage and the sixth control relay 318 configured to control a lift coil, a fifth fused circuit 328 between the voltage and the third control relay 310 configured to control the starter solenoid, and a sixth fused circuit 330 between the fourth control relay 314 configured to control the main relay and a switch supply (i.e., an engine enable). Further, the plurality of fused circuits 304 may include a seventh fused circuit 332 between the voltage and the battery, an eighth fused circuit 334 between the fourth control relay 314 configured to control the main relay and an electronic control module, a ninth fused circuit 336 between the fourth control relay 314 configured to control the main relay, a heatsink and a main relay output, a tenth fused circuit 338 to ground the circuit board 22, a eleventh fused circuit 340 between an electronic control module switched voltage fused and an the electronic control module switched voltage, and a twelfth fused circuit 342 for a glow plug output.

Still referring to FIGS. 2 and 3A, as a more in depth example of the current limiting of the present disclosure, the third control relay 310 is an alternator excitation circuit configured to supply power to the industrial engine alternator 343 and excite a plurality of field windings with electrical energy. A resistor 344 prevents overcurrent and diodes 346 prevent the back feed of electrical energy into the power distribution module 10. Further, the starter solenoid of the alternator is communicatively coupled to the third control relay 310 configured to control the starter solenoid, via the first example distribution harness 12a (FIG. 4A), the second example distribution harness 12b (FIG. 4B) and/or the like. Further, it should be appreciated that this arrangement allows a user to replace diodes in the event the user destroys the diode protections.

Other circuits may include a sensor and/or sender power supply circuit configured to supply power to the senders and/or sensors attached to the industrial engine. In embodiments, the sensors require power to allow the industrial engine to start and run properly.

Now referring to FIG. 3B, the pin layout of the plurality of relay circuits 302, the plurality of fused circuits 304, and the plurality of attachment connectors 29 (e.g., the interface attachment connector 30, the power attachment connector 32, the first engine attachment connector 34, and the second engine attachment connector 36) will be discussed.

As illustrated, the circuit board 22 of the power distribution module 10 is configured to input/output a plurality of power requirements and signals to various components of the vehicle with the industrial engine and the plurality of relay circuits 302 and the plurality of fused circuits 304 of the power distribution module 10. That is, it should be appreciated that the power distribution module 10 may control a plurality of external power switching circuits configured to control the flow of current to various engine related systems via a power switching device, as discussed above. It should be appreciated that the pin layout of FIG. 3B and the components described is not limited to the disclosure herein and the disclosure herein is merely an example thereof, as appreciated by one skilled in the art. Further, the pin layout is only briefly discussed for brevity reasons with the understanding that one skilled in the art would fully understand the circuits, the components, the industrial engine applicability, the distribution harness, and the like, and the interactions therebetween.

Figure 3B:
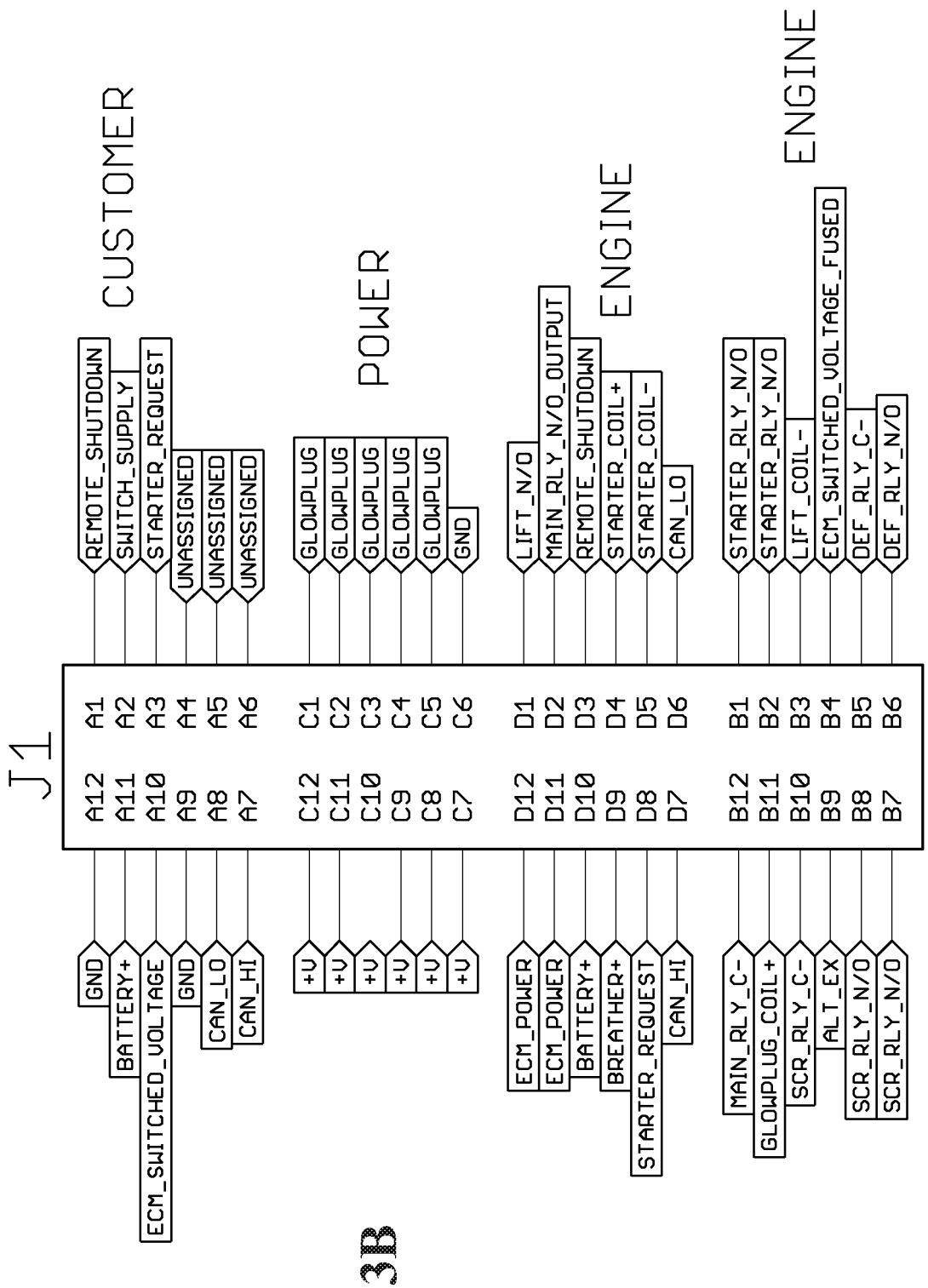
FIG. 3B schematically depicts a schematic of a pin layout schematic of the power distribution module of FIG. 1 according to one or more embodiments shown and described herein.

Still referring to FIG. 3B and in particular referring to the interface attachment connector 30 pins, pin A1 is communicatively coupled to the remote shutdown, pin A2 is communicatively coupled to the switch supply, pin A3 is communicatively coupled to the starter request, pins A4, A5, and A6 are unassigned, pin A7 is communicatively coupled to the CAN high, pin A8 is communicatively coupled to the CAN low, pin A9 is communicatively coupled to the ground, pin A10 is communicatively coupled to the electronic control module switched voltage, pin A11 is communicatively coupled to the battery plus terminal and pin A12 is communicatively coupled to the ground.

Still referring to FIG. 3B and in particular referring now to the second engine attachment connector 36, pins B1 and B2 are communicatively coupled to the starter relay, pin B3 is communicatively coupled to the lift coil, pin B4 is communicatively coupled to the electronic control module switched voltage fused, pin B5 is communicatively coupled to the DEF relay negative, pin B6 is communicatively coupled to the DEF relay, pin B7 and B8 are communicatively coupled to the SCR relay, pin B09 is communicatively coupled to the alternator excite, pin B10 is communicatively coupled to the SCR relay negative, pin B11 is communicatively coupled to the glow plug coil positive, and pin B12 is communicatively coupled to the main relay.

Still referring to FIG. 3B and in particular referring now to the power attachment connector 32, pins C1, C2, C3, C4 and C5 are communicatively coupled to the glow plugs, pin C6 is communicatively coupled to the ground, and pins C7, C8, C9, C10, C11 and C12 are communicatively coupled to the voltage and/or power input.

Still referring to FIG. 3B and in particular referring now to the first engine attachment connector 34, pin D1 is communicatively coupled to the lift, pin D2 is communicatively coupled to the main relay output, pin D3 is communicatively coupled to the remote shutdown, pin D4 is communicatively coupled to the starter coil positive terminal, pin D5 is communicatively coupled to the starter coil negative terminal, pin D6 is communicatively coupled to the CAN low, pin D7 is communicatively coupled to the CAN high, pin D8 is communicatively coupled to the starter request, pin D9 is communicatively coupled to the breather, pin D10 is communicatively coupled to the battery plus terminal, and pins D11 and D12 are communicatively coupled to the electronic module power.

Now referring to FIG. 4A, the first example distribution harness 12a will be discussed. The first example distribution harness 12a includes a first end 401 having a plurality of receptacle connectors 402, 404, 406 configured to releasably attach to the power attachment connector 32, the first engine attachment connector 34 and the second engine attachment connector 36 of the power distribution module 10. Further, in a non-limiting example, each of the plurality of receptacle connectors 402, 404, 406 are 12-pin deustsch connectors.

A second end 407 of the first example distribution harness 12a includes a plurality of junction connectors, such as stakeons, eyelets, sockets of varying pins, and the like as appreciated by one skilled in the art. Further, the first end 401 with the plurality of receptacle connectors 402, 404, 406 is communicatively coupled to the second end 407 with the plurality of junction connectors via a plurality of conductors 408, illustrated as a solid line in FIG. 4A. The plurality of conductors 408 is adapted to distribute power to the various outputs of the power distribution module 10, such as the necessary fusing, engine, and sensor connections.

That is, the second end 407 is configured to communicatively couple the power distribution module 10 to at least one electrical component in industrial engine applications. For example, the first example distribution harness 12a is configured to communicatively couple to the glow plug 412, the DEF components 414, the DEF power 416, a coolant diverter 418, a DEF pressure line 420, a DEF return line 422, and a DEF suction line 424. Further, the first example distribution harness 12a is configured to communicatively couple to the alternator excite circuit 426, the starter solenoid 428, the positive terminal of the battery 430 along with the negative terminal of the battery 432, a wait to disconnect lamp 434, and a switch input return for the okay to elevate speed 436.

The first example distribution harness 12a is further configured to communicatively couple to other electrical components via the seventy socket 438, such as, without limitation, a fuel relay, battery, ground, SCR temperature, PH injector, CAN A, CAN C, a switch input, wait to disconnect lamp, remote shutdown, ignition switched battery input, and the like.

Now referring to FIG. 4B, the second example distribution harness 12b will be discussed. The second example distribution harness 12b includes a first end 501 having the plurality of receptacle connectors 402, 404, 406 configured to releasably attach to the power attachment connector 32, the first engine attachment connector 34 and the second engine attachment connector 36 of the power distribution module 10. Further, in a non-limiting example, each of the plurality of receptacle connectors 402, 404, 406 are 12-pin deustsch connectors.

A second end 507 of the second example distribution harness 12b includes a plurality of junction connectors, such as stakeons, eyelets, sockets of varying pins, and the like as appreciated by one skilled in the art. Further, the first end 501 with the plurality of receptacle connectors 402, 404, 406 is communicatively coupled to the second end 507 with the plurality of junction connectors via a plurality of conductors 508, illustrated as a sold line in FIG. 4B. The plurality of conductors 508 is adapted to distribute power to the various outputs of the power distribution module 10, such as the necessary fusing, engine, and sensor connections.

That is, the second end 507 is configured to communicatively couple the power distribution module 10 to at least one electrical component in industrial engine applications. For example, the second example distribution harness 12b is configured to communicatively couple to the glow plug 512, the DEF components such as a DEF power supply module 514, a coolant diverter 516, a DEF tank header 518, a DEF suction line 520, a DEF return line 522, a DEF pressure line 524, and a DEF injector 525. Further, the second example distribution harness 12b is configured to communicatively couple to the alternator excite circuit 526, the starter solenoid 528, a breather heater 530, the positive terminal of the battery 532 along with the negative terminal of the battery 534, a heater control unit 550, a customer interconnect 8-way 552, a customer interconnect 12 way 554, a CAN pin resistor 556, a wait to disconnect lamp 560, and a switch input return for the okay to elevate speed 562.

The second example distribution harness 12b is configured to communicatively couple to a plurality of sensors, such as, an air inlet temperature sensor 536, a DCO inlet temperature sensor 538, a tailpipe temperature sensor 540, a SCR inlet temperature sensor 542, a NH3 ammonia sensor 544, a Nox upstream sensor 546, a Nox downstream sensor 548, and a water in fuel sensor 558.

The second example distribution harness 12b is further configured to communicatively couple to other electrical components via the ninety-six position connector 564, such as, without limitation, engine coolant diverter signal, a starter request, exhaust gas sensor supply, air inlet temperature signal, glow plug control feedback, CAN high, CAN low, key switch, ground, SCR temperature, a switch input, remote shutdown, battery input, and the like.

Now referring to FIG. 5, the interface harness 600 will be described. The interface harness 600 includes a first end 602 having a single receptacle connector 604 configured to releasably attach to the interface attachment connector 30 (FIG. 2). Further, in a non-limiting example, the single receptacle connector 604 is a 12-pin deustsch connector. A second end 606 of the interface harness 600 includes a plurality of junction connectors, such as stakeons, eyelets, sockets of varying pins, and the like, as appreciated by one skilled in the art. Further, the first end 602 is communicatively coupled to the second end 606 via a plurality of conductors 608, illustrated as a solid lines in FIG. 5. The plurality of conductors 608 is adapted to distribute and/or receive power and signals to and from the various electrical components, such as an engine start panel 610, a CAN-BUS display 612, and the like.

The interface harness 600 is configured for a simplistic, single connector harness that communicatively couples the power distribution module 10 (FIG. 2) to the machine side and, in particular, to the engine start panel 610 and the CAN-BUS display 612 to start, run, throttle, view all engine parameters, and remotely shutdown the industrial engine 614. For example, the interface harness communicatively couples the power distribution module 10 (FIG. 2) to a supplied battery power, at pin P$11. an engine start crank signal at pin P$3, and an ignition key switch signal at pin P$10 that is initiated from a key switch 616 of the engine start panel 610, which in turn permits the industrial engine 614 to start. It should be appreciated that the industrial engine 614 is operably coupled to the engine start panel 610.

The interface harness 600 is communicatively coupled to an ignition key switch signal, at pin P$10, a switch input (return) at pin P$2, a remote engine shutdown at pin P$1, the engine start crank signal at pin P$3, the supplied battery at pin P$11, a CAN shield at pin P$9, a battery negative at pin P$12, a warning horn at pin P$4, a CAN high at pin P$7 and a CAN low at pin P$8. The CAN shield, CAN high, CAN low, ignition key switch signal and battery negative are communicatively coupled to the CAN-BUS display 612, which includes a throttle control 618 for the engine 614. Further, the ignition key switch signal P$10, the supplied battery power P$11 and the engine start crank signal P$3 are communicatively coupled to the engine start panel 610.

As such, the interface harness 600 provides all the necessary fusing, engine, and sensor connections and provides a simplistic connector for simplistic integration. Further, the interface harness 600 provides a connection to the engine start panel 610 to start and run the industrial engine 614 while the CAN-BUS display 612 provides the means to throttle the industrial engine 614 and permits the user to view all engine parameters. Further, the interface harness 600 permits a remote shutdown the industrial engine 614 through a single connector.

It should be appreciated that an advantage of the power distribution module is that it can be used across a variety of models of industrial engines by using a standardized housing and similar circuit boards, the intended uses for which including each of starting, running, monitoring, and providing appropriate fusing requirements for industrial engines.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A power distribution system for an industrial engine, the system comprising:
a power distribution module comprising:
a housing body defining an interior,
an end wall portion having an interior surface and an exterior surface, the interior surface configured to abut the interior of the housing body in a closed position, the entire exterior surface of the end wall is external to the interior of the housing body,
a circuit board coupled to the interior surface of the end wall portion and positioned within the interior of the housing body, and
a plurality of attachment connectors communicatively coupled to the circuit board, the plurality of attachment connectors positioned on the exterior surface of the end wall portion,
a distribution harness communicatively coupled to the plurality of attachment connectors and to at least one electrical component; and
an interface harness communicatively coupled to one of the plurality of attachment connectors,
wherein the interface harness is configured to communicatively couple the power distribution module to an engine start panel for the industrial engine.

2. The system of claim 1, wherein:
the distribution harness is a plurality of electrical conductors, and
the plurality of electrical conductors is configured to distribute power from the power distribution module to the at least one electrical component.

3. The system of claim 2, wherein:
the plurality of electrical conductors electrically cooperate with the plurality of attachment connectors to communicatively couple the at least one electrical component with the circuit board, and the plurality of electrical conductors are adapted to distribute power from the power distribution module to the at least one electrical component and distribute power to the power distribution module.

4. The system of claim 1, wherein the industrial engine is a diesel engine.

5. The system of claim 1, wherein the distribution harness further comprises a first end having three receptacle connectors configured to couple to three corresponding attachment connectors of the plurality of attachment connectors.

6. The system of claim 5, wherein the three corresponding attachment connectors of the plurality of attachment connectors are independently keyed to the three receptacle connectors of the distribution harness.

7. The system of claim 6, wherein the distribution harness further comprises a second end having a plurality of junction connectors configured to couple to the at least one electrical component.

8. The system of claim 7, wherein the at least one electrical component is at least one from the group of an engine starter motor control circuit, an engine fuel pump power circuit, an engine clean emission module system power circuit, an engine glow plug circuit, an alternator power circuit, a diesel exhaust fluid pumps and reversing valves control circuit, and a selective catalytic reduction emissions circuit.

9. The system of claim 1, wherein a controller area network communication bus is communicatively coupled to the power distribution module.

10. The system of claim 1, wherein:
the interface harness further comprises a first end having a single receptacle connector configured to couple to one corresponding attachment connector of the plurality of attachment connectors, and
the one corresponding attachment connector of the plurality of attachment connectors is independently keyed to the single receptacle connector of the interface harness.

11. The system of claim 10, wherein:
the interface harness further comprises a second end having a plurality of junction connectors configured to couple to the engine start panel, and
the interface harness configured to supply a battery power for a key switch of the engine start panel, supply a ground connection, monitor for a starter input and an enable engine, and monitor a controller area network communication bus high and a controller area network communication bus low, and provide for a remote shutdown.

12. A power distribution system, the system comprising:
a power distribution module comprising:
a housing body defining an interior,
an end wall portion having an interior surface and an exterior surface, the interior surface configured to abut the interior of the housing body in a closed position,
a circuit board coupled to the interior surface of the end wall portion such that in the closed position, the circuit board is positioned within the interior of the housing body; and
a plurality of attachment connectors communicatively coupled to the circuit board, the plurality of attachment connectors positioned on the exterior surface of the end wall portion to provide an accessible location outside of the interior of the housing body;

a distribution harness communicatively coupled to the plurality of attachment connectors and to at least one electrical component of the industrial engine, the distribution harness configured to distribute power from the power distribution module to the at least one electrical component; and an interface harness communicatively coupled to one of the plurality of attachment connectors,
wherein the interface harness is configured to communicatively couple the power distribution module to an engine start panel of the industrial engine and an engine control,
wherein the engine start panel provides for starting the industrial engine and the engine control provides for a throttle control of the industrial engine.

13. The system of claim 12, wherein:
the distribution harness is a plurality of electrical conductors, the plurality of electrical conductors electrically cooperate with the plurality of attachment connectors to connect to the at least one electrical component, and
the plurality of electrical conductors are adapted to distribute power from the power distribution module to the at least one electrical component and distribute power to the power distribution module.

14. The system of claim 13, wherein:
the distribution harness further comprises a first end having three receptacle connectors configured to couple to three corresponding attachment connectors of the plurality of attachment connectors, and
the three corresponding attachment connectors of the plurality of attachment connectors are independently keyed to the three receptacle connectors of the distribution harness.

15. The system of claim 14, wherein:
the distribution harness further comprises a second end having a plurality of junction connectors configured to couple to the at least one electrical component,
the at least one electrical component is at least one from the group of an engine starter motor control circuit, an engine fuel pump power circuit, an engine clean emission module system power circuit, an engine glow plug circuit, an alternator power circuit, a diesel exhaust fluid pumps and reversing valves control circuit, and a selective catalytic reduction emissions circuit.

16. The system of claim 12, wherein the circuit board is a printed circuit board having at least two layers, the printed circuit board is a layered fiberglass impregnated with an epoxy and a copper foil.

17. The system of claim 12, wherein a controller area network communication bus is communicatively coupled to the power distribution module.

18. The system of claim 12, wherein:
the interface harness further comprises a first end having a single receptacle connector configured to couple to one corresponding attachment connector of the plurality of attachment connectors.

19. The system of claim 18, wherein the one corresponding attachment connector of the plurality of attachment connectors is independently keyed to the single receptacle connector of the interface harness.

20. The system of claim 19, wherein:
the interface harness further comprises a second end having a plurality of junction plugs configured to couple to the engine start panel, the engine start panel includes a plurality of components,
the plurality of components having a supplied battery power for a key switch, a supplied ground connection, a starter input, an enable engine, a controller area network communication bus high, a controller area network communication bus low, and a remote shutdown, wherein the power distribution module is communicatively coupled to at least one of the plurality of components via the interface harness.

* * * * *